US012789682B2

(12) United States Patent
Friesen et al.

(10) Patent No.: US 12,789,682 B2
(45) Date of Patent: Nov. 10, 2026

(54) HOOK RETENTION CLIP

(71) Applicant: Leggett & Platt Canada Co., Halifax (CA)

(72) Inventors: Jacob Friesen, Leamington (CA); Suyash Chavan, Windsor (CA); Luke Liang, Lasalle (CA)

(73) Assignee: Leggett & Platt Canada Co., Halifax (CA)

( * ) Notice: Subject to any disclaimer, the term of this patent is extended or adjusted under 35 U.S.C. 154(b) by 199 days.

(21) Appl. No.: 18/652,141

(22) Filed: May 1, 2024

(65) Prior Publication Data

US 2024/0367564 A1 Nov. 7, 2024

Related U.S. Application Data

(60) Provisional application No. 63/499,445, filed on May 1, 2023.

(51) Int. Cl.
*F16B 45/02* (2006.01)
*B60N 2/66* (2006.01)
*F16B 45/00* (2006.01)

(52) U.S. Cl.
CPC .............. *B60N 2/663* (2015.04); *F16B 45/00* (2013.01)

(58) Field of Classification Search
CPC ......... F16B 45/02; F16B 45/04; F16B 45/033
See application file for complete search history.

(56) References Cited

U.S. PATENT DOCUMENTS 6,427,296 B1 * 8/2002 Chang .................. F16B 45/036 24/601.2
7,946,005 B2 * 5/2011 Lee ...................... F16B 45/008 24/601.2
9,718,383 B2 * 8/2017 Matsui ................. B60N 2/7094
9,771,009 B2 9/2017 Kuma et al.
(Continued)

FOREIGN PATENT DOCUMENTS

CN 203793177 U 8/2014
CN 114370591 A 4/2022
DE 29719329 U1 2/1998
(Continued)

OTHER PUBLICATIONS

International Search Report and Written Opinion for Application No. PCT/CA2024/050585 dated Aug. 29, 2024 (9 pages).

*Primary Examiner* — Brian M O'Hara
(74) *Attorney, Agent, or Firm* — Michael Best & Friedrich LLP

(57) ABSTRACT

An attachment assembly comprises a hook and a hook retention clip. The hook includes an extension portion defining a hook axis, a loop portion having a loop end, and a transition portion. A recess is defined within the loop portion, and a main opening to the recess is defined between the loop end and the transition portion. The hook retention clip is configured to be coupled to the hook. The hook retention clip includes an extension mating portion defining a retention clip axis and a lip extending at an angle away from the retention clip axis. The lip has a lip tip. When the hook retention clip is coupled to the hook, the retention clip axis and the hook axis are coaxial and an effective opening to the recess is defined between the lip tip and the loop end, and the effective opening is smaller than the main opening.

19 Claims, 7 Drawing Sheets

(56) References Cited

U.S. PATENT DOCUMENTS

2015/0306998 A1* 10/2015 Matsui ................. B60N 2/7058
297/452.52

FOREIGN PATENT DOCUMENTS

| | | | | |
|---|---|---|---|---|
| JP | 5435764 B2 * | 3/2014 | | ............... B60N 2/72 |
| WO | 2014040162 A1 | 3/2014 | | |
| WO | 2015106338 A1 | 7/2015 | | |
| WO | 2019148266 A1 | 8/2019 | | |

* cited by examiner

HOOK RETENTION CLIP

CROSS-REFERENCE TO RELATED APPLICATIONS

This application claims priority to U.S. Provisional Patent Application No. 63/499,445, filed on May 1, 2023, the entire content of which is incorporated by reference herein.

FIELD OF THE DISCLOSURE

The present disclosure relates to attachment mechanisms.

BACKGROUND OF THE DISCLOSURE

Different types of hooks have found widespread use as a simple and readily adaptable solution for latching components together in a variety of mechanical devices and other systems. Hooks provide a relatively simple and cost-effective structure to manufacture and apply to latch parts together in any number of different types of applications. For example, hooks are often used to attach lumbar adjustment systems to the support frames found in vehicle seats. In such applications, the lumbar adjustment system is coupled to the closed end of a hook by means of a cable or like component and a portion of the seat support frame is inserted through the opposite open end of the hook and into a receiving recess to secure the hook and associated lumbar adjustment system to the frame. However, the hook may become unintentionally dislodged from the frame if inadvertently jostled or otherwise loosened. Therefore, improved apparatuses and methods for retaining a hook on a substrate and/or retaining a substrate within a hook are provided.

SUMMARY OF THE DISCLOSURE

In some aspects, the techniques described herein relate to an attachment assembly including: a hook including an extension portion defining a hook axis, a loop portion having a loop end, and a transition portion between the extension portion and the loop portion, wherein a recess is defined within the loop portion, and wherein a main opening to the recess is defined between the loop end and the transition portion; and a hook retention clip configured to be coupled to the hook, the hook retention clip including an extension mating portion defining a retention clip axis and a lip extending at an angle away from the retention clip axis, the lip having a lip tip, wherein when the hook retention clip is coupled to the hook, the retention clip axis and the hook axis are coaxial and an effective opening to the recess is defined between the lip tip and the loop end, and wherein the effective opening is smaller than the main opening.

In some aspects, the techniques described herein relate to an attachment assembly, wherein the lip and the extension mating portion are resilient.

In some aspects, the techniques described herein relate to an attachment assembly, wherein the hook retention clip is configured to be coupled to the hook via a snap fit.

In some aspects, the techniques described herein relate to an attachment assembly, wherein the hook retention clip is configured to be coupled to the hook via a press fit.

In some aspects, the techniques described herein relate to an attachment assembly, wherein the extension mating portion includes a first extension mating portion and a second extension mating portion that are coupled together via a living hinge, thereby allowing the extension mating portion to move between an open state, in which the hook retention clip may receive the hook, and a closed state, in which the hook is captured between the first extension mating portion and the second extension mating portion.

In some aspects, the techniques described herein relate to an attachment assembly, wherein the hook retention clip includes a curved loop mating portion and a transition mating portion, the curved loop mating portion configured to at least partially receive the loop portion of the hook and the transition mating portion configured to receive the transition portion of the hook.

In some aspects, the techniques described herein relate to an attachment assembly, wherein the transition portion has a transition radius of curvature and a transition center of curvature, and wherein the lip has a lip radius of curvature and a lip center of curvature, and wherein the transition center of curvature and the lip center of curvature are on opposite sides of the hook.

In some aspects, the techniques described herein relate to an attachment assembly, wherein the transition portion and the lip diverge from the axis in opposite directions.

In some aspects, the techniques described herein relate to a lumbar support system for a seat with a frame, the lumbar support system including: an adjustable lumbar support mechanism including a cable having an end; and the attachment assembly coupled to the end of the cable, wherein the attachment assembly is configured to couple the end of the cable to the frame.

In some aspects, the techniques described herein relate to a lumbar support system, wherein the lip is engageable with the frame to inhibit removal of the attachment assembly from the frame.

In some aspects, the techniques described herein relate to a hook retention clip including: a resilient extension mating portion configured to removably couple to an extension portion of a hook, the extension mating portion defining an axis; and a resilient lip diverging from the axis and configured to extend toward a loop end of the hook when the hook retention clip is coupled to the hook, wherein the hook retention clip is configured to inhibit removal of the hook from a substrate.

In some aspects, the techniques described herein relate to a hook retention clip, wherein the hook includes a recess having a main opening and wherein the lip is configured to reduce a length of the main opening to a smaller effective opening.

In some aspects, the techniques described herein relate to a hook retention clip, wherein the hook retention clip is made of plastic, and the extension mating portion is press fit onto the extension portion of the hook.

In some aspects, the techniques described herein relate to a hook retention clip, wherein the extension mating portion includes an attachment opening extending along a length of the extension mating portion, the attachment opening configured to snap fit onto the extension portion of the hook.

In some aspects, the techniques described herein relate to a hook retention clip, further including: a loop mating portion having a loop mating portion end, wherein the loop mating portion extends along an arc of a circle, and an intersection point between the axis and the circle at a location nearest to the extension mating portion.

In some aspects, the techniques described herein relate to a hook retention clip, wherein the loop mating portion end is 180 degrees from the intersection point in a direction along the arc of the circle away from the point.

In some aspects, the techniques described herein relate to a hook retention clip, wherein the loop mating portion end is approximately 90 to 270 degrees from the intersection point in a direction along the arc of the circle away from the point.

In some aspects, the techniques described herein relate to a lumbar support system for a seat including: a support structure; and an adjustable lumbar support mechanism including an actuator system and a support member terminating in an attachment mechanism configured to removably couple the support member to a frame of the seat, the attachment mechanism including a loop defining a recess therein and a resilient lip configured to reduce a size of a main opening to the recess to a smaller effective opening.

In some aspects, the techniques described herein relate to a lumbar support system, wherein the attachment mechanism includes a hook retention clip and a hook, wherein the hook retention clip includes the lip, and wherein the hook retention clip is removably couplable to the hook.

In some aspects, the techniques described herein relate to a lumbar support system, wherein the hook retention clip includes an extension mating portion having an opening in a side thereof, the extension mating portion configured to removably clip onto an extension portion of the hook.

Other aspects of the invention will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. Also, as used herein and in the appended claims, the terms “upper,” “lower,” “top,” “bottom,” “front,” “back,” and other directional terms are not intended to require any particular orientation but are instead used for purposes of description only.

Figure 1:
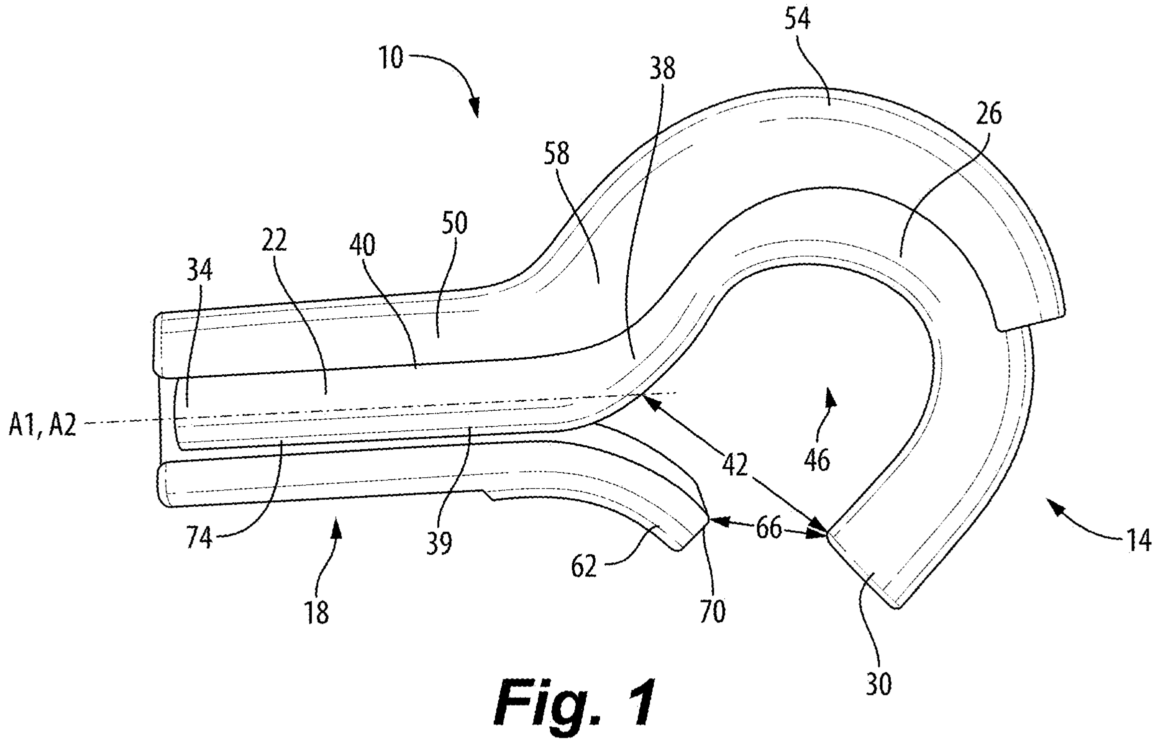
FIG. 1 illustrates an attachment assembly including a hook coupled to a hook retention clip according to an embodiment of the present disclosure.

FIG. 1 illustrates an attachment assembly 10 including a hook 14 and a hook retention clip 18 according to one exemplary embodiment of the present disclosure. The hook 14 includes a hook extension portion 22 and an at least partially curved loop portion 26. The loop portion 26 may be at least partially defined by a semicircular arc (see FIG. 6A). The hook extension portion 22 may be straight or approximately straight. The loop portion 26 terminates in a first end or a hook end 30 (which may also be referred to as a loop end 30), and in some embodiments, the hook extension portion 22 may terminate in a second end or a hook extension portion end 34 opposite the hook end 30. The hook extension portion end 34 is configured to be coupled to a tension member such as a cable, wire, a rod, a rope, a string, or the like or to any other device to which a hook may be coupled. A hook transition portion 38 between the hook extension portion 22 and the loop portion 26 may be at least partially curved. The loop portion 26 and the hook transition portion 38 may be curved in opposite directions. In other words, the loop portion 26 may include a loop radius of curvature having a loop center of curvature on a first (bottom) side 39 of the hook 14, and the hook transition portion 38 may include a hook transition radius of curvature having a hook transition center of curvature on a second (top) side 40 of the hook 14. In other words, the loop center of curvature and the transition center of curvature may be on opposite sides of the hook 14. The loop radius of curvature and the hook transition radius of curvature may be measured from a point on the centerline of the hook 14.

With continued reference to FIG. 1, the loop portion 26 defines a main opening 42 between the hook end 30 and the transition portion 38 and a recess 46 within the loop portion 26. The recess 46 may also be considered at least partially defined by the main opening 42. The loop portion 26 is configured to clip or hook onto a substrate (FIG. 2) by receiving the substrate within the main opening 42 and holding the substrate within the recess 46.

With continued reference to the embodiment of FIG. 1, the hook retention clip 18 includes an extension mating portion 50 (which also may be referred to as a sleeve portion), a loop mating portion 54 (which also may be referred to as a hood portion), a transition mating portion 58 positioned between the extension mating portion 50 and the loop mating portion 54, and a lip 62 (which also may be referred to as a tab or tang). The transition mating portion 58 extends from a top side of the extension mating portion 50, and the lip 62 extends in a divergent manner with respect to a direction of the transition mating portion 58. In other words, the lip 62 extends from a bottom side of the extension mating portion 50 in a direction generally toward the hook end 30 when the hook retention clip 18 is coupled to the hook 14. An effective opening 66 is defined between a lip tip 70 and the hook end 30. The effective opening 66 is configured such that a substrate (i.e., something that may be hooked by the hook 14 such as a wire, a rope, a piece of metal having a hole or slot therein through which the hook end 30 may pass, etc.) deflects the lip 62 to pass through the effective opening 66 and enter the recess 46. The effective opening 66 is smaller than the main opening 42 to inhibit detachment of the hook retention clip 18 from the substrate.

That is, the lip 62 reduces a width of the main opening 42 to the smaller, effective opening 66.

With continued reference to FIG. 1, the extension mating portion 50 is configured to couple to the extension portion 22 of the hook 14. For example, the extension mating portion 50 may be generally shaped as a partial cylinder having an axis A1 that is parallel with an axis A2 of the extension portion 22. In the illustrated embodiment, the axis A1 of the extension mating portion 50 is coaxial or substantially coaxial with extension portion 22. The lip 62 may extend at an angle from the axis A1 of the extension mating portion and/or at an angle from the axis A2 of the extension portion 22. The extension mating portion 50 may include an opening 74 or slot defined in a side of the extension mating portion 50 and extending along the axis A1. A portion or the entirety of the hook retention clip 18 may be resilient (i.e., made of a resilient material and/or designed to have a resilient component) such that the extension mating portion 50 of hook retention clip 18 can be resiliently fitted over the extension portion 22 of the hook 14 by slipping or snap fitting the extension mating portion 50 over the extension portion 22. When the hook retention clip 18 is installed over the hook 14, the loop mating portion 54 will fit over the loop portion 26 and at least partially cover the loop portion 26. The transition mating portion 58 is configured to fit over with the transition portion 38. As mentioned, the lip 62 may be resilient such that the lip 62 will deflect when a substrate is inserted into the recess 46.

Figure 2:
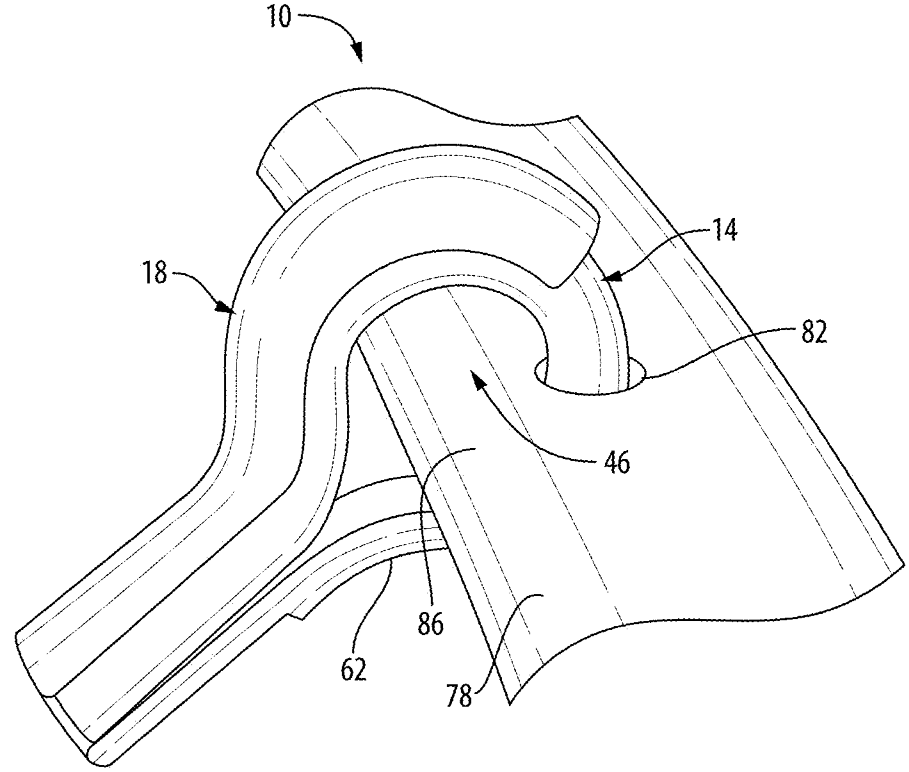
FIG. 2 illustrates the attachment assembly of FIG. 1 coupled to a substrate.

With reference to FIG. 2, in operation, the attachment assembly 10 is configured to hook onto a substrate 78 by inserting the hook end 30 through a hole 82, slot, or the like in the substrate 78. As an edge 86 of the substrate 78 is inserted through the effective opening 66, the lip 62 deflects inward toward the recess 46 and captures the edge 86 within the recess 46 to inhibit removal of the substrate 78 from the recess 46. To remove the attachment assembly 10 from the substrate 78, the edge 86 of the substrate 78 is pulled out from the recess 46, which will deflect the lip 62 outward away from the recess 46 to allow the edge 86 to be removed from the recess 46 and disconnect the attachment assembly 10 from the substrate 78. As a result, the attachment assembly 10 may be selectively attached to and removed from the substrate 78 with the lip 62 inhibiting removal of the attachment assembly 10 from the substrate 78 when the substrate 78 is inserted into the recess 46 of hook 14.

Figure 3:
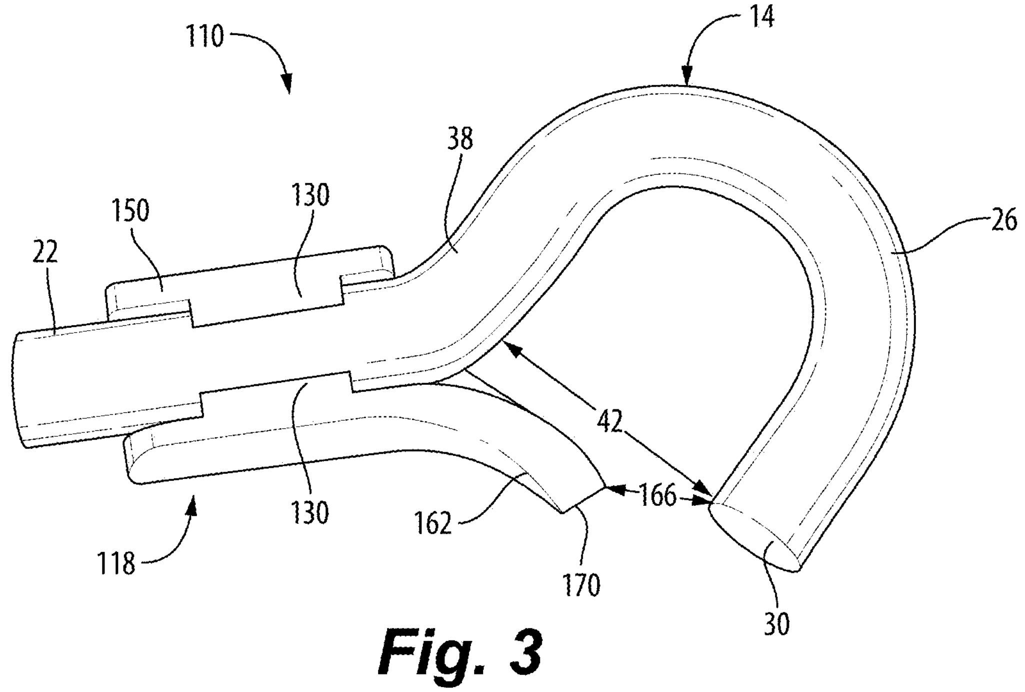
FIG. 3 illustrates an attachment assembly including a hook coupled to a hook retention clip according to an embodiment of the present disclosure.

With reference to FIG. 3, an embodiment of an attachment assembly 110 includes the hook 14 and a hook retention clip 118. The attachment assembly 110 may be similar to other attachment assemblies disclosed herein except for certain visible and/or noted differences. The hook retention clip 118 includes an extension mating portion 150 configured to be removably attached (for example, by snap-fit, sliding, clipping, etc.) to the hook extension portion 22. In the embodiment of FIG. 3, the extension mating portion 150 includes one or more projections 130, such as the pair of projections 130. The pair of projections 130 are configured to resiliently clip or snap over the hook extension portion 22 and removably retain the hook retention clip 118 on the hook 14. Similar to the embodiment described above as depicted in FIGS. 1 and 2, the hook retention clip 118 of FIG. 3 is configured to be selectively attached to and removed from the hook 14 as described above. Specifically, the extension mating portion 150 includes a lip 162 that extends from a bottom side of the extension mating portion 150 in a direction generally toward the hook end 30 when the hook retention clip 118 is coupled to the hook 14. An effective opening 166 is defined between a lip tip 170 and the hook end 30, which is smaller than the main opening 42. The effective opening 166 is configured to permit a substrate (e.g., the substrate 78) to pass through the effective opening 166 while deflecting the lip 162 and to limit the attachment assembly 110 from inadvertently disconnecting from the substrate 78. The substrate 78 is anything that may be hooked by the hook 14 such as a wire, a rope, a piece of metal having a hole or slot therein through which the hook end 30 may pass.

Figure 4:
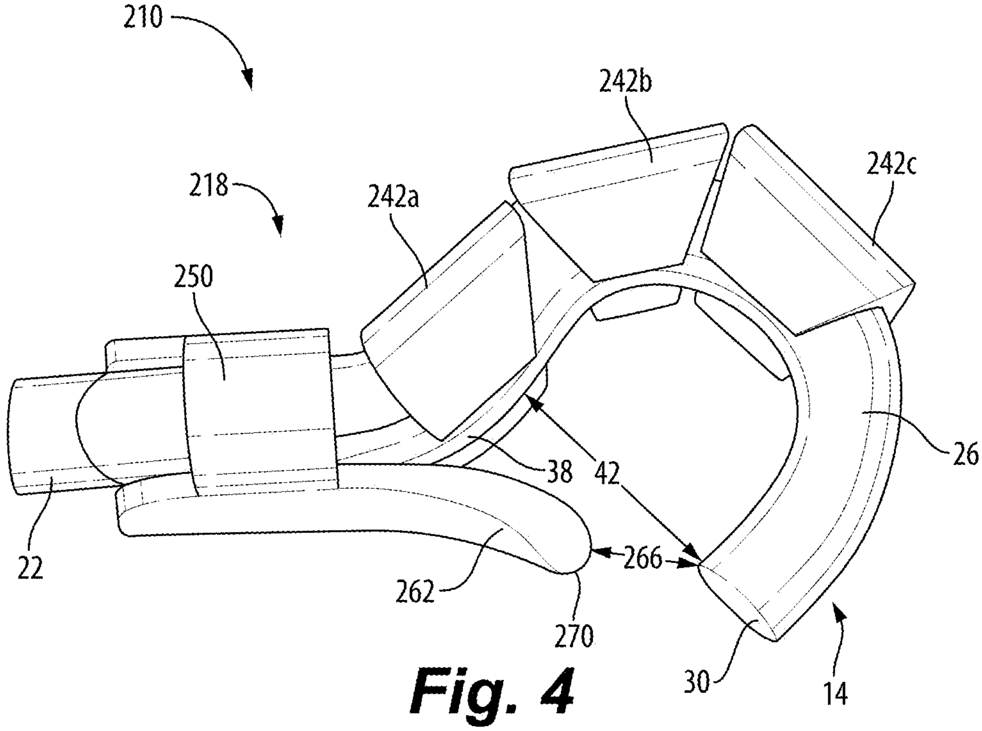
FIG. 4 illustrates an attachment assembly including a hook coupled to a hook retention clip according to an embodiment of the present disclosure.
Figure 5:
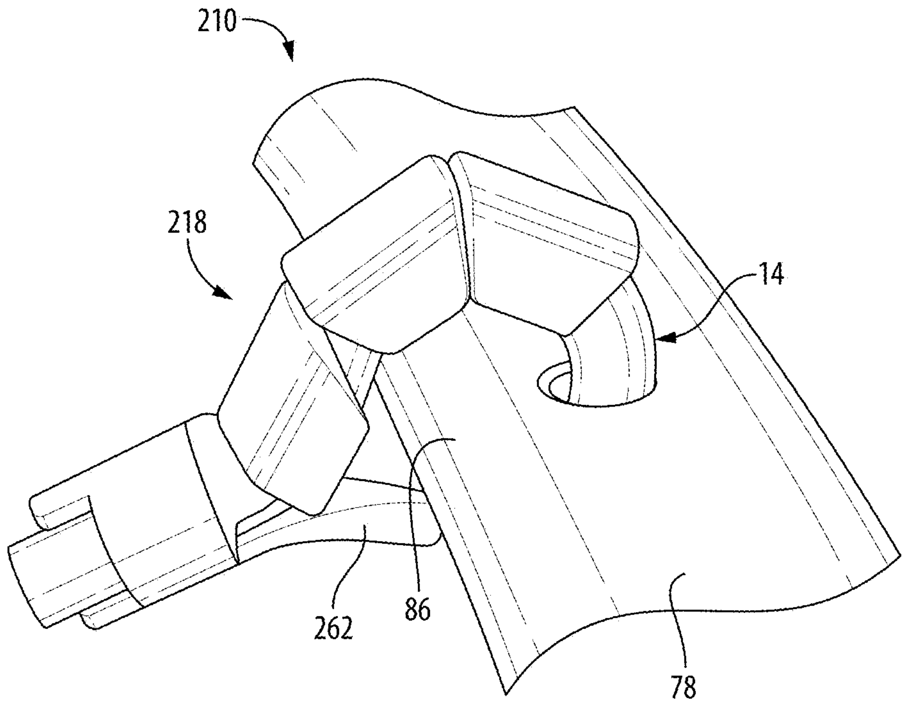
FIG. 5 illustrates the attachment assembly of FIG. 4 coupled to a substrate.

With reference to FIG. 4, another embodiment of an attachment assembly 210 includes the hook 14 and a hook retention clip 218. The attachment assembly 210 may be similar to other attachment assemblies disclosed herein except for certain visible and/or noted differences. The hook retention clip 218 includes an extension mating portion 250 configured to attach to (for example, by resiliently clipping/snap fitting into place or by another method) and/or at least partially enclose the hook extension portion 22. The extension mating portion 250 includes a lip 262. In other words, the extension mating portion 250 and the lip 262 may be a single unitary piece. Specifically, the lip 262 extends from a bottom side of the extension mating portion 250 in a direction generally toward the hook end 30 when the hook retention clip 218 is coupled to the hook 14. An effective opening 266 is defined between a lip tip 270 and the hook end 30, which is smaller than the main opening 42. As shown in FIG. 5, the effective opening 266 is configured to permit a substrate (e.g., the substrate 78) to pass through the effective opening 266 while deflecting the lip 262 and to limit the attachment assembly 210 from inadvertently disconnecting from the substrate 78. The substrate 78 is anything that may be hooked by the hook 14 such as a wire, a rope, a piece of metal having a hole or slot therein through which the hook end 30 may pass.

The hook retention clip 218 may include segments 242*a*, 242*b*, 242*c* (FIG. 4) that are connected to each other and to the hook 14 by, for example, an attachment compound such as glue, epoxy, or the like. Specifically, the segments 242*a*, 242*b*, 242*c* may at least partially enclose the loop portion 26 and/or the transition portion 38. The hook retention clip 218 can be affixed to the hook 14 via an attachment compound or another manner. Any of the embodiments of hook retention clips or assemblies disclosed herein may be similarly permanently affixed to a hook.

Figure 6A:
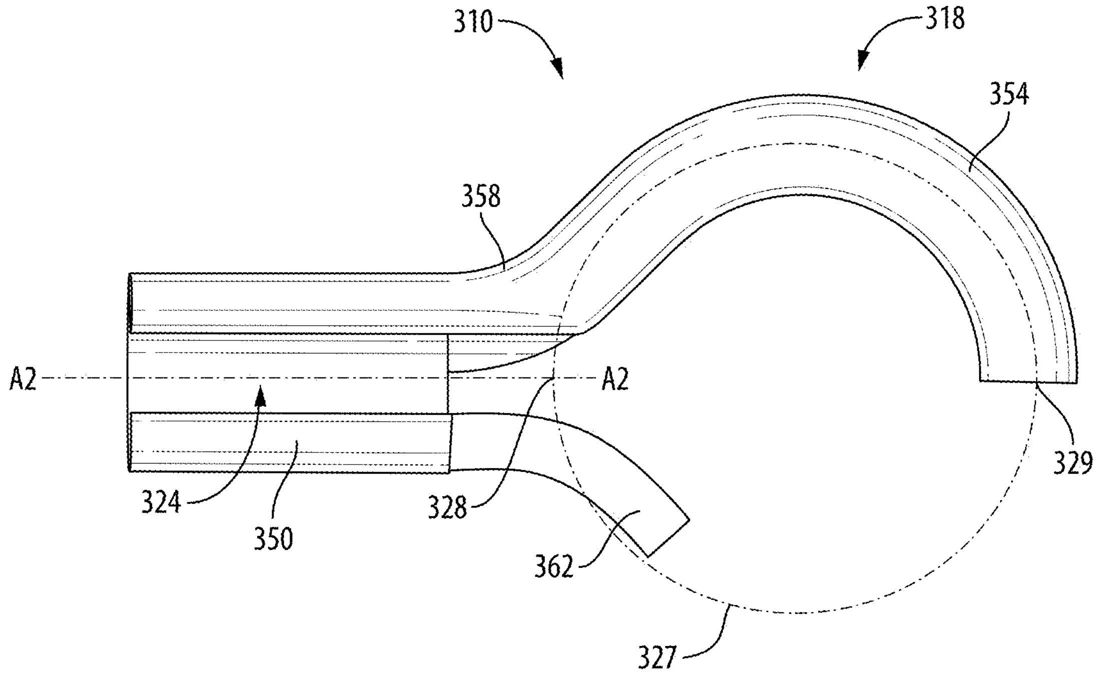
FIG. 6A illustrates a hook retention clip according to an embodiment of the present disclosure.

With reference to FIG. 6A, an embodiment of an attachment assembly 310 including a hook retention clip 318 configured to receive a hook, such as the hook 14. The hook retention clip 318 includes an extension mating portion 350, a loop mating portion 354, a transition mating portion 358 between the extension mating portion 350 and the loop mating portion 354, and a lip 362 extending from the extension mating portion 350. The hook retention clip 318 may be similar in aspects to the other hook retention clip embodiments disclosed herein, except for certain visible and/or noted differences.

As illustrated in the embodiment of FIG. 6A, the lip 362 may be integrated with the extension mating portion 350 such that the extension mating portion 350, the loop mating portion 354, transition mating portion 358, and lip 362 are formed as a single unitary piece. The loop mating portion 354 is shaped as an arc of a circle 327 such that a length of the loop mating portion 354 can be measured in terms of degrees. The circle 327 may align with—that is, be centered on—a centerline or axis A2 of the loop mating portion 354. A point 328 is defined where the axis A2 intersects with the circle 327. The point 328 on the circle 327 is adjacent the extension mating portion 350 and the transition mating portion 358. An opening, such as slot 324, extends along the axis A2 to allow the extension mating portion 350 to couple to an extension portion of a hook (e.g., the extension portion 22 of the hook 14). In the embodiment and orientation of FIG. 6A, an end 329 of the loop mating portion 354 is positioned approximately 180 degrees in a clockwise direction from point 328 along an arc of the circle 327. That is, the loop mating portion 354 extends between the transition mating portion 358 and the end 329 approximately 180 degrees around the circle 327. In other embodiments, the loop mating portion end 329 may alternatively extend less than 45 degrees, approximately 45 degrees, between 45 and 180 degrees, between 180 and 225 degrees, approximately 225 degrees, between 225 degrees and 270 degrees, approximately 270 degrees, or greater than 270 degrees in a clockwise direction from point 328 along an arc of the circle 327 as shown in the orientation of FIG. 6A. The transition mating portion 358 may have a transition mating portion radius of curvature that is less than, approximately equal to, or greater than a radius of curvature of the lip 362. In some embodiments, the circle 327 passes through the lip 362. The geometric relationships disclosed in the FIG. 6A embodiment may be present in the other hook retention clip embodiments disclosed herein. In operation, the hook retention clip 318 may function as part of an attachment assembly similar to the other hook retention clip embodiments disclosed herein.

Figure 6B:
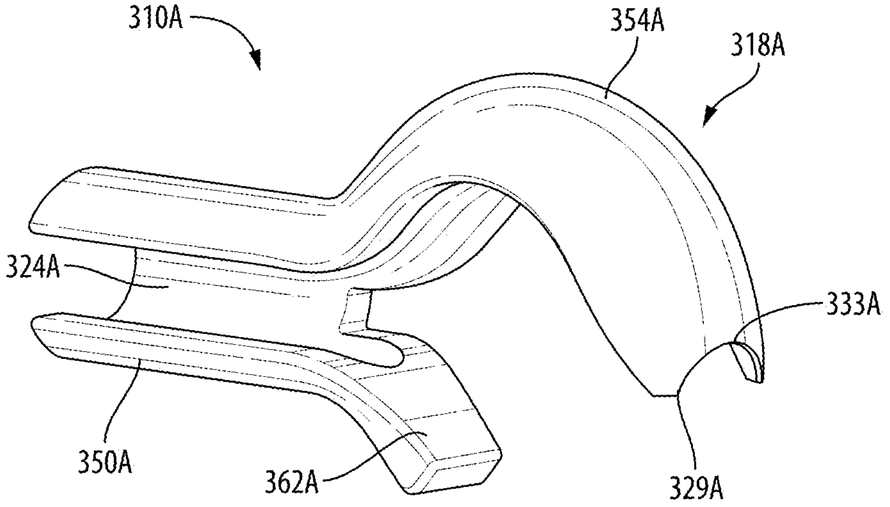
FIG. 6B illustrates a hook retention clip according to another embodiment of the present disclosure.
Figure 6C:
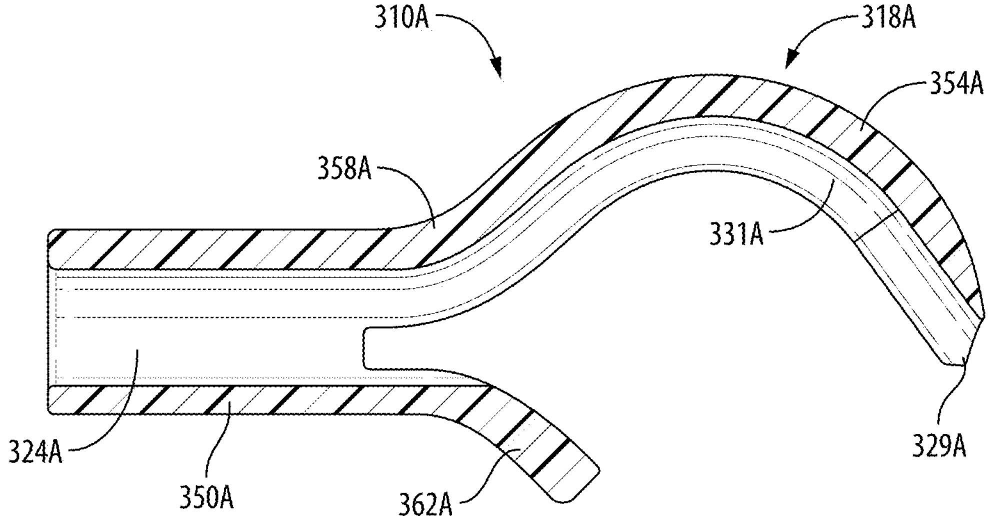
FIG. 6C is a cross-sectional view of the hook retention clip of FIG. 6B.

For example, FIGS. 6B-C illustrate another embodiment of an attachment assembly 310A including a hook retention clip 318A configured to receive a hook (e.g., the hook 14). The attachment assembly 310A is similar to the attachment assembly 310 described above with reference to FIG. 6A, and features of the attachment assembly 310A corresponding with features of the attachment assembly 310 are given like reference numbers appended by the letter "A." In addition, the following description focuses primarily on differences between the attachment assembly 310A and the attachment assembly 310.

Referring to FIGS. 6B-C, the hook retention clip 318A includes an extension mating portion 350A, a loop mating portion 354A, a transition mating portion 358A between the extension mating portion 350A and the loop mating portion 354A, and a lip 362A extending from the extension mating portion 350A. The loop mating portion 354A of the hook retention clip 318A includes a curved groove 331A extending along the underside of the loop mating portion 354A, forming an extension of the slot 324A. The curved groove 331A extends through the loop mating portion end 329A, such that an arcuate opening 333A is defined in the loop mating portion end 329A. In the illustrated embodiment, the curved groove 331A and arcuate opening 333A have a semi-circular cross-sectional shape; however, the curved groove 331A and arcuate opening 333A may have other shapes (e.g., corresponding to a differently shaped loop portion of a hook) in other embodiments. The arcuate opening 333A helps taper the loop mating portion 354A towards the loop portion 26 of the hook 14 to avoid inadvertently snagging the hook retention clip 318 on another object while assembling onto the substrate 78.

Figure 7:
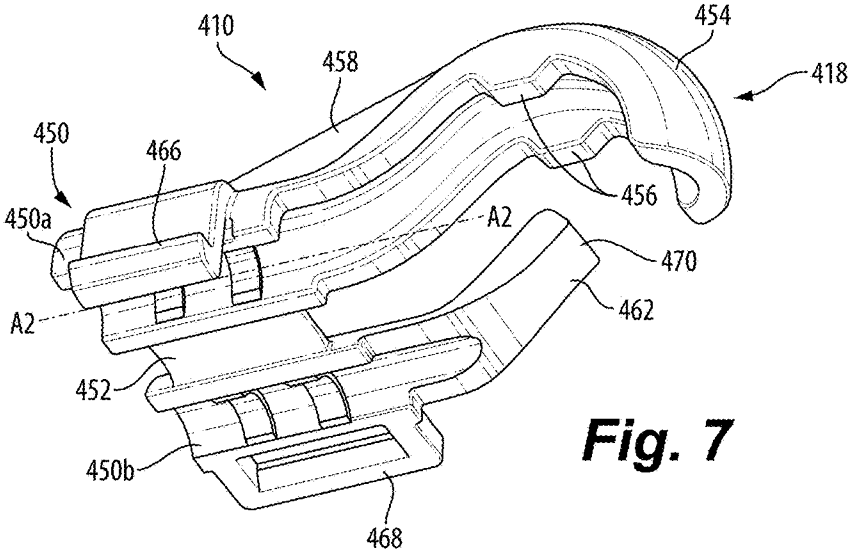
FIG. 7 illustrates a hook retention clip according to yet another embodiment of the present disclosure.

With reference to FIG. 7, in another embodiment, an attachment assembly 410 includes a hook retention clip 418 configured to receive a hook, such as the hook 14. The hook retention clip 418 includes an extension mating portion 450, a loop mating portion 454, a transition mating portion 458 between the extension mating portion 450 and the loop mating portion 454, and a lip 462 (which also may be referred to as a tab or tang) extending from the extension mating portion 450. The hook retention clip 418 may be similar in aspects to the other hook retention clip embodiments disclosed herein, except for certain visible and/or noted differences. The lip 462 is be integrated with the extension mating portion 450 such that the extension mating portion 450, loop mating portion 454, transition mating portion 458, and lip 462 are formed as a single unitary piece.

With continued reference to FIG. 7, the extension mating portion 450 includes a first extension mating portion 450*a* and a second extension mating portion 450*b* that are connected together via a living hinge 452. The living hinge 452 allows the second extension mating portion 450*b* to easily bend or move relative to the first extension mating portion 450*a*. In an open state, the second extension mating portion 450*b* is pivoted away from the first extension mating portion 450*a*, while in a closed state, the first and second extension mating portions 450*a*, 450*b* interface with each other to generally form a cylinder defining an axis A2. In the open state, the first extension mating portion 450*a* may receive the hook extension portion 22 of the hook 14 and the loop mating portion 454 may receive the loop portion 26 of the hook 14. A pair of projections 456 are formed on the loop mating portion 454 and extend inward toward the hook 14 to resiliently clip or snap over the loop portion 26 of the hook 14. At the point, the second extension mating portion 450*b* can pivot toward the first extension mating portion 450*a* to capture and retain the hook extension portion 22 of the hook 14. Now, the hook 14 is coupled to and retained within the hook retention clip 418. The living hinge 452 extends in a direction parallel with the axis A2 in the illustrated embodiment but may be oriented differently in other embodiments.

The living hinge 452 allows the hook retention clip 418 to be coupled to the hook 14 after the hook 14 is attached to the tension member (e.g., cable, etc.). For example, a method of attaching the hook retention clip 418 to the hook 14 may include attaching the tension member to the hook 14 (e.g., by crimping the hook on to the end of the tension member, or via any other suitable process), then, with the hook retention clip 418 in its open state, inserting the hook extension portion 22 of the hook 14 into one of the first extension mating portion 450*a* or the second extension mating portion 450*b*. The second extension mating portion 450*b* and the first extension mating portion 450*a* are then pivoted towards each other about the living hinge 452 to the closed state.

As shown in FIG. 7, the loop mating portion 454 is coupled to the first extension mating portion 450*a*, while the lip 462 is coupled to the second extension mating portion 450*b*. Furthermore, the first extension mating portion 450*a* includes a cantilevered hook 466 and the second extension mating portion 450*b* includes a hook receptacle 468. The cantilevered hook 466 and the hook receptacle 468 form a snap-fit coupling, such that the first and second extensions mating portions 450*a*, 450*b* are configured to easily and quickly be coupled together. As the cantilevered hook 466 is passing through the hook receptacle 468, the cantilevered hook 466 temporarily deforms (e.g., bends) due to mechanical interference with portions of the hook receptacle 468 and then snaps back to its pre-deformation state to semi-permanently couple the first and second extensions mating portions 450*a*, 450*b* together.

When the first and second extensions mating portions 450*a*, 450*b* are coupled together, the lip 462 extends from a bottom side of the extension mating portion 450 in a direction generally toward the hook end 30 when the hook retention clip 418 is coupled to the hook 14. Specifically, the lip 462 extends at an angle relative to the axis A2 towards the hook end 30. An effective opening (similar to the opening 66) is defined between a lip tip 470 and the hook end 30. The effective opening is configured to permit the substrate 78 to pass through the effective opening while deflecting the lip 462 and to limit the attachment assembly 410 from inadvertently disconnecting from the substrate 78. The substrate 78 is anything that may be hooked by the hook 14 such as a wire, a rope, a piece of metal having a hole or slot therein through which the hook end 30 may pass.

A portion or the entirety of the hook retention clip 418 may be resilient (i.e., made of a resilient material and/or designed to have a resilient component) such that the lip 462 deflects when the substrate passes through the effective opening (similar to the opening 66).

Figure 8:
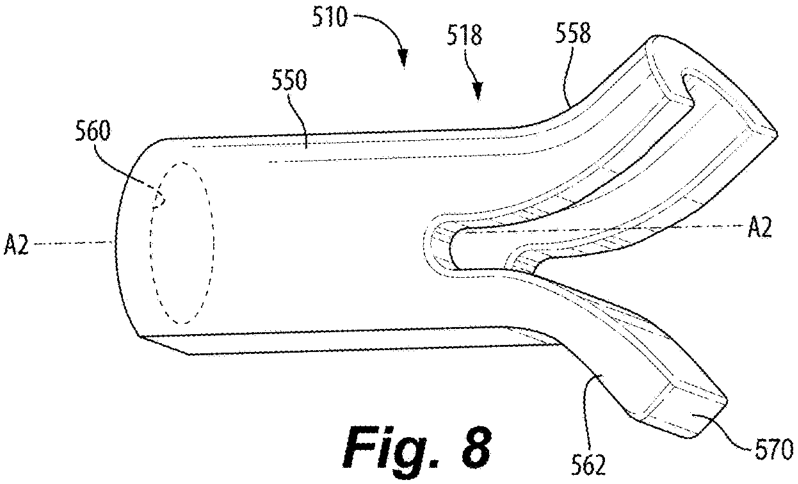
FIG. 8 illustrates a hook retention clip according to still yet another embodiment of the present disclosure.

With reference to FIG. 8, in another embodiment, an attachment assembly 510 includes a hook retention clip 518 configured to receive a hook, such as the hook 14. The hook retention clip 518 includes an extension mating portion 550, a transition mating portion 558, and a lip 562 (which also may be referred to as a tab or tang) extending from the extension mating portion 550. The hook retention clip 518 may be similar in aspects to the other hook retention clip embodiments disclosed herein, except for certain visible and/or noted differences.

The extension mating portion 550 includes an aperture 560 that is configured to be slid and press fit onto the hook extension portion 22 until the transition mating portion 558 engages the hook transition portion 38. In some embodiments, the hook retention clip 518 may be sleeved on to the tension member (e.g., cable, etc.) before the hook 14 is attached to the tension member. That is, a method of attaching the hook retention clip 518 to the hook 14 may include inserting an end of the tension member through the aperture 560, attaching the tension member to the hook 14 (e.g., by crimping the hook on to the end of the tension member, or via any other suitable process), and then sliding the aperture 560 of the hook retention clip 518 over the hook extension portion 22 to press fit the hook retention clip 518 on to the hook 14.

The lip 562 is integrated with the extension mating portion 550 such that the extension mating portion 550, transition mating portion 558, and lip 562 are formed as a single unitary piece. The lip 462 extends at an angle relative to the axis A2 generally towards the hook end 30. Specifically, the lip 562 extends from a bottom side of the extension mating portion 550 in a direction toward the hook end 30 when the hook retention clip 518 is coupled to the hook 14. The transition mating portion 558 extends from an upper side of the extension mating portion 550 in a different direction that the lip 562. An effective opening (similar to the opening 66) is defined between a lip tip 570 and the hook end 30. The effective opening is configured to permit a substrate (e.g., the substrate 78) to pass through the effective opening while deflecting the lip 562 and to limit the attachment assembly 510 from inadvertently disconnecting from the substrate 78. The substrate 78 is anything that may be hooked by the hook 14 such as a wire, a rope, a piece of metal having a hole or slot therein through which the hook end 30 may pass.

Figure 9:
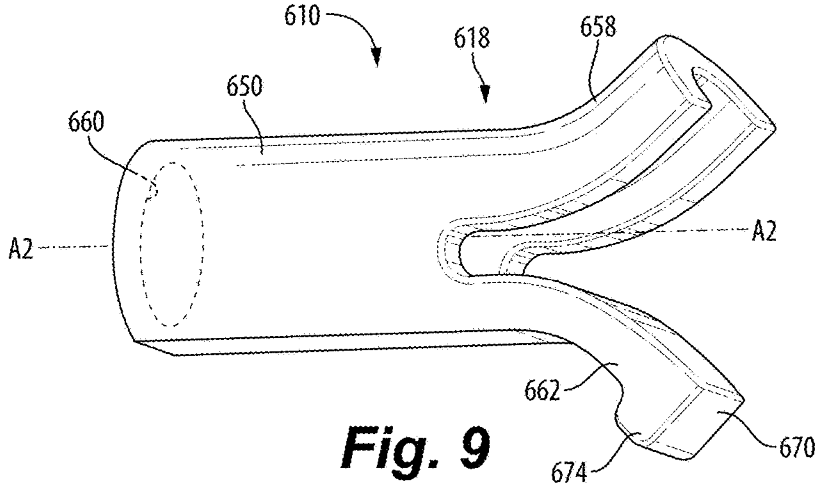
FIG. 9 illustrates a hook retention clip according to still yet another embodiment of the present disclosure.

With reference to FIG. 9, another embodiment of an attachment assembly 610 includes a hook retention clip 618 configured to receive a hook, such as the hook 14. The hook retention clip 618 includes similar features to that of the hook retention clip 518, plus "100". The differences between the hook retention clip 618 and the hook retention clip 518 are explained herein.

The hook retention clip 618 includes an extension mating portion 650, a transition mating portion 658, a lip 662 (which also may be referred to as a tab or tang) extending from the extension mating portion 650, and an aperture 660 that is configured to be slid and press fit onto the hook extension portion 22. The hook retention clip 618 further includes a projection 674 on the lip tip 670 that is configured to further inhibit the attachment assembly 610 from inadvertently decoupling from the substrate 78. The projection 674 extends in a direction generally perpendicular to the lip 662. Specifically, the projection 674 extends away from the recess 46 (FIG. 1) of the loop portion 26.

Attachment assemblies 10, 110, 210, 310, 310A, 410, 510, 610 may be used in a wide variety of applications.

Figure 10:
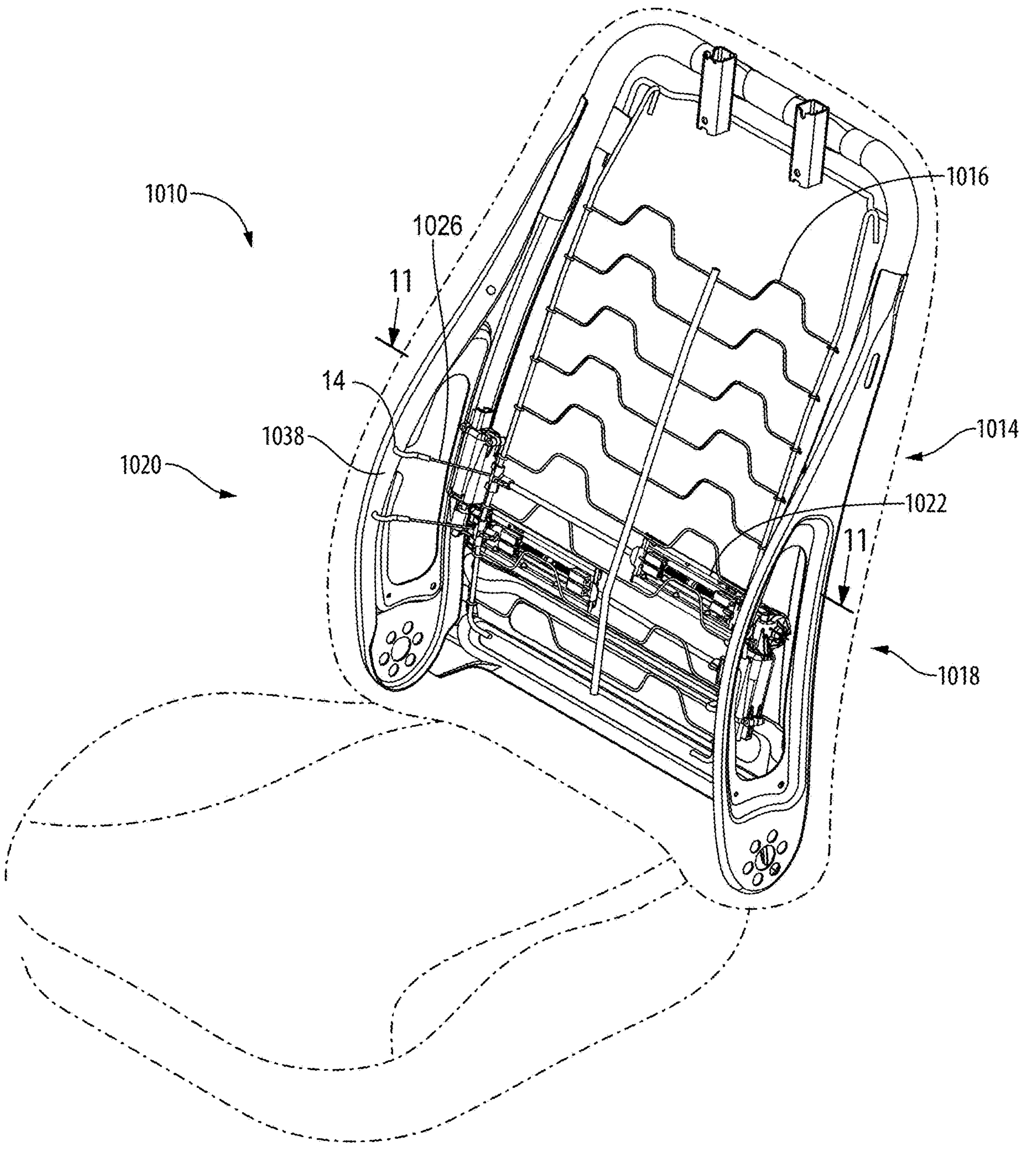
FIG. 10 illustrates a vehicle seat comprising a lumbar support system.
Figure 11:
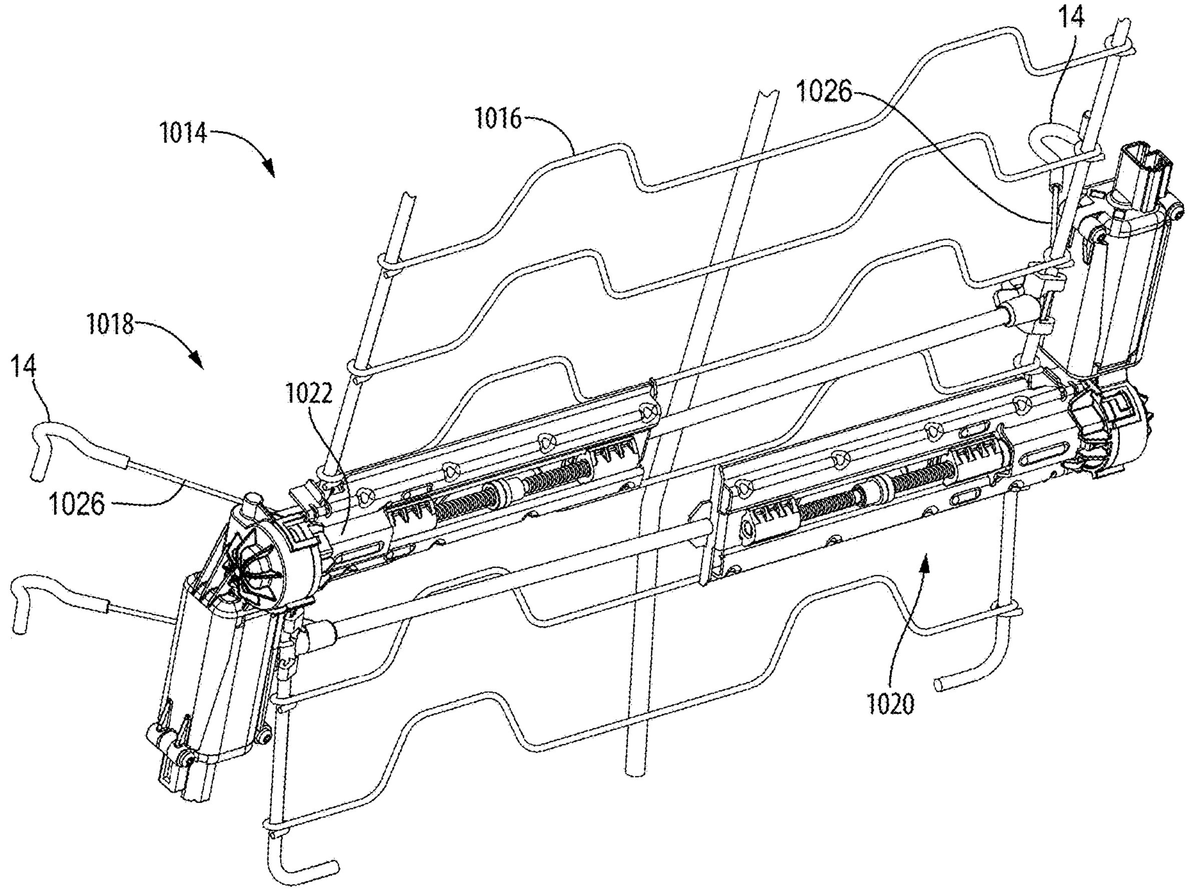
FIG. 11 illustrates the lumbar support system of FIG. 7.

For example, with reference to FIGS. 10 and 11, a vehicle seat 1010 includes a lumbar support system 1014. The lumbar support system 1014 includes a support structure which may be a wireframe structure 1016, as well as adjustable lumbar support mechanisms 1018, 1020 which in some embodiments may be similar to, or mirror images of each other. With reference to the adjustable lumbar support mechanism 1018, for example, the adjustable lumbar support mechanism 1018 includes an actuator system 1022 with a motor. In the embodiments of FIGS. 10 and 11, the adjustable lumbar support mechanisms 1018, 1020 further include tension members 1026 (e.g., cables) having ends fixed to hooks 14. The hook retention clips 18, 118, 218, 318, 318A, 418, 518, 618 described and illustrated herein are configured to be coupled to the hooks 14 (either before or after the hooks 14 are fixed to the ends of the tension members 1026) to define attachment assemblies 10, 110, 210, 310, 310A, 410, 510, 610 for attachment to a seat frame 1038 (e.g., the substrate 78). The attachment assemblies 10, 110, 210, 310, 310A, 410, 510, 610 function to keep the tension member 1026 attached to the frame 1038 during adjustment and transport of the vehicle seat 1010, and particularly during assembly of the vehicle seat 1010 when there may not be tension on the tension members 1026.

With continued reference to FIGS. 10 and 11, in operation, the adjustable lumbar support mechanisms 1018, 1020 are configured to selectively increase or decrease tension within the lumbar support system 1014. For example, the actuator system 1022 either increases or decreases tension on the tension member 1026 and the attachment assemblies 10, 110, 210, 310, 310A, 410, 510, 610 which, in turn, is transferred to the frame 1038 and the wireframe structure 1016. When the applied tension increases across the tension member 1026 and the attachment assemblies 10, 110, 210, 310, 310A, 410, 510, 610, the wireframe structure 1016 tends to move in a forward direction (i.e., towards a back of a person in the vehicle seat 1010). In contrast, when the applied tension decreases across the tension member 1026 and the attachment assemblies 10, 110, 210, 310, 310A, 410, 510, 610, the wireframe structure 1016 tends to move in a rearward direction (i.e., away from a back of a person in the vehicle seat 1010).

REPRESENTATIVE FEATURES

Representative features are set out in the following clauses, which stand alone or may be combined, in any combination, with one or more features disclosed in the text and/or drawings of the specification.

Clause 1. An attachment assembly comprising: a hook including an extension portion defining a hook axis, a loop portion having a loop end, and a transition portion between the extension portion and the loop portion, wherein a recess is defined within the loop portion, and wherein a main opening to the recess is defined between the loop end and the transition portion; and a hook retention clip configured to be coupled to the hook, the hook retention clip including an extension mating portion defining a retention clip axis and a lip extending at an angle away from the retention clip axis, the lip having a lip tip, wherein when the hook retention clip is coupled to the hook, the retention clip axis and the hook axis are coaxial and an effective opening to the recess is defined between the lip tip and the loop end, and wherein the effective opening is smaller than the main opening.

Clause 2. The attachment assembly of clause 1, wherein the lip and the extension mating portion are resilient.

Clause 3. The attachment assembly of clause 1, wherein the hook retention clip is configured to be coupled to the hook via a snap fit.

Clause 4. The attachment assembly of clause 1, wherein the hook retention clip is configured to be coupled to the hook via a press fit.

Clause 5. The attachment assembly of clause 1, wherein the extension mating portion includes a first extension mating portion and a second extension mating portion that are coupled together via a living hinge, thereby allowing the extension mating portion to move between an open state, in which the hook retention clip may receive the hook, and a closed state, in which the hook is captured between the first extension mating portion and the second extension mating portion.

Clause 6. The attachment assembly of clause 1, wherein the hook retention clip includes a curved loop mating portion and a transition mating portion, the curved loop mating portion configured to at least partially receive the loop portion of the hook and the transition mating portion configured to receive the transition portion of the hook.

Clause 7. The attachment assembly of clause 1, wherein the transition portion has a transition radius of curvature and a transition center of curvature, and wherein the lip has a lip radius of curvature and a lip center of curvature, and wherein the transition center of curvature and the lip center of curvature are on opposite sides of the hook.

Clause 8. The attachment assembly of clause 7, wherein the transition portion and the lip diverge from the axis in opposite directions.

Clause 9. A lumbar support system for a seat with a frame, the lumbar support system comprising: an adjustable lumbar support mechanism including a cable having an end; and the attachment assembly of clause 1 coupled to the end of the cable, wherein the attachment assembly is configured to couple the end of the cable to the frame.

Clause 10. The lumbar support system of clause 9, wherein the lip is engageable with the frame to inhibit removal of the attachment assembly from the frame.

Clause 11. A hook retention clip comprising: a resilient extension mating portion configured to removably couple to an extension portion of a hook, the extension mating portion defining an axis; and a resilient lip diverging from the axis and configured to extend toward a loop end of the hook when the hook retention clip is coupled to the hook, wherein the hook retention clip is configured to inhibit removal of the hook from a substrate.

Clause 12. The hook retention clip of clause 11, wherein the hook includes a recess having a main opening and wherein the lip is configured to reduce a length of the main opening to a smaller effective opening.

Clause 13. The hook retention clip of clause 11, wherein the hook retention clip is made of plastic, and the extension mating portion is press fit onto the extension portion of the hook.

Clause 14. The hook retention clip of clause 11, wherein the extension mating portion includes an attachment opening extending along a length of the extension mating portion, the attachment opening configured to snap fit onto the extension portion of the hook.

Clause 15. The hook retention clip of clause 11, further comprising: a loop mating portion having a loop mating portion end, wherein the loop mating portion extends along an arc of a circle, and an intersection point between the axis and the circle at a location nearest to the extension mating portion.

Clause 16. The hook retention clip of clause 15, wherein the loop mating portion end is 180 degrees from the intersection point in a direction along the arc of the circle away from the point.

Clause 17. The hook retention clip of clause 15, wherein the loop mating portion end is approximately 90 to 270 degrees from the intersection point in a direction along the arc of the circle away from the point.

Clause 18. A lumbar support system for a seat comprising: a support structure; and an adjustable lumbar support mechanism including an actuator system and a support member terminating in an attachment mechanism configured to removably couple the support member to a frame of the seat, the attachment mechanism including a loop defining a recess therein and a resilient lip configured to reduce a size of a main opening to the recess to a smaller effective opening.

Clause 19. The lumbar support system of clause 18, wherein the attachment mechanism includes a hook retention clip and a hook, wherein the hook retention clip includes the lip, and wherein the hook retention clip is removably couplable to the hook.

Clause 20. The lumbar support system of clause 19, wherein the hook retention clip includes an extension mating portion having an opening in a side thereof, the extension mating portion configured to removably clip onto an extension portion of the hook.

Various features and advantages of the invention are set forth in the following claims.

What is claimed is:

1. An attachment assembly comprising:

a hook including an extension portion defining a hook axis, a loop portion having a loop end, and a transition portion between the extension portion and the loop portion, wherein a recess is defined within the loop portion, and wherein a main opening to the recess is defined between the loop end and the transition portion; and a hook retention clip configured to be coupled to the hook, the hook retention clip including an extension mating portion defining a retention clip axis and a lip extending at an angle away from the retention clip axis, the lip having a lip tip, wherein the hook retention clip includes a transition mating portion extending from the extension mating portion and a curved loop mating portion extending from the transition mating portion such that the transition mating portion is between the extension mating portion and the curved loop mating portion, the curved loop mating portion configured to at least partially receive the loop portion of the hook and the transition mating portion configured to receive the transition portion of the hook, wherein when the hook retention clip is coupled to the hook, the retention clip axis and the hook axis are coaxial and an effective opening to the recess is defined between the lip tip and the loop end, and wherein the effective opening is smaller than the main opening.

2. The attachment assembly of claim 1, wherein the lip and the extension mating portion are resilient.

3. The attachment assembly of claim 1, wherein the hook retention clip is configured to be coupled to the hook via a snap fit.

4. The attachment assembly of claim 1, wherein the hook retention clip is configured to be coupled to the hook via a press fit.

5. The attachment assembly of claim 1, wherein the extension mating portion includes a first extension mating portion and a second extension mating portion that are coupled together via a living hinge, thereby allowing the extension mating portion to move between an open state, in which the hook retention clip may receive the hook, and a closed state, in which the hook is captured between the first extension mating portion and the second extension mating portion.

6. The attachment assembly of claim 1, wherein the transition portion has a transition radius of curvature and a transition center of curvature, and wherein the lip has a lip radius of curvature and a lip center of curvature, and wherein the transition center of curvature and the lip center of curvature are on opposite sides of the hook.

7. The attachment assembly of claim 6, wherein the transition portion and the lip diverge from the axis in opposite directions.

8. A lumbar support system for a seat with a frame, the lumbar support system comprising:

an adjustable lumbar support mechanism including a cable having an end; and the attachment assembly of claim 1 coupled to the end of the cable, wherein the attachment assembly is configured to couple the end of the cable to the frame.

9. The lumbar support system of claim 8, wherein the lip is engageable with the frame to inhibit removal of the attachment assembly from the frame.

10. A hook retention clip comprising:

a resilient extension mating portion configured to removably couple to an extension portion of a hook, the extension mating portion defining an axis;

a transition mating portion extending from a first end of the extension mating portion;

a curved loop mating portion extending from the transition mating portion generally opposite the extension mating portion, wherein the loop mating portion is configured to at least partially receive a loop portion of the hook, and the transition mating portion is configured to receive a transition portion of the hook between the extension portion and the loop portion; and a resilient lip extending from the first end of the extension mating portion in a direction diverging from the axis, the lip configured to extend toward a loop end of the loop portion of the hook when the hook retention clip is coupled to the hook, wherein the hook retention clip is configured to inhibit removal of the hook from a substrate.

11. The hook retention clip of claim 10, wherein the hook includes a recess having a main opening and wherein the lip is configured to reduce a length of the main opening to a smaller effective opening.

12. The hook retention clip of claim 10, wherein the hook retention clip is made of plastic, and the extension mating portion is press fit onto the extension portion of the hook.

13. The hook retention clip of claim 10, wherein the extension mating portion includes an attachment opening extending along a length of the extension mating portion, the attachment opening configured to snap fit onto the extension portion of the hook.

14. The hook retention clip of claim 10, wherein the loop mating portion extends along an arc of a circle, and an intersection point between the axis and the circle is defined at a location nearest to the extension mating portion.

15. The hook retention clip of claim 14, wherein the loop mating portion includes a loop mating portion end offset 180 degrees from the intersection point in a direction along the arc of the circle away from the intersection point.

16. The hook retention clip of claim 14, wherein the loop mating portion includes a loop mating portion end offset approximately 90 to 270 degrees from the intersection point in a direction along the arc of the circle away from the intersection point.

17. A lumbar support system for a seat comprising:

a support structure; and an adjustable lumbar support mechanism including an actuator system and a support member terminating in an attachment mechanism configured to removably couple the support member to a frame of the seat, the attachment mechanism including a hook including an extension portion, a loop portion having a main opening, and a transition portion between the extension portion and the loop portion, and a hook retention clip configured to be coupled to the hook, the hook retention clip including an extension mating portion, a transition mating portion extending from the extension mating portion, a lip extending from the extension mating portion, and a curved loop mating portion extending from the transition mating portion such that the transition mating portion is between the extension mating portion and the curved loop mating portion, wherein the curved loop mating portion receives the loop portion of the hook, and the transition mating portion receives the transition portion of the hook, and wherein the lip is configured to reduce a size of the main opening of the hook to a smaller effective opening.

18. The lumbar support system of claim 17, wherein the hook retention clip is removably couplable to the hook.

19. The lumbar support system of claim 18, wherein the extension mating portion has an opening in a side thereof.

* * * * *